United States Patent [19]

Ameter

[11] Patent Number: 5,028,223
[45] Date of Patent: Jul. 2, 1991

[54] MAGNETICALLY ATTACHED SUPPORT DEVICE FOR WINDSHIELD REPAIR APPARATUS

[76] Inventor: Stephen L. Ameter, 1715 Linda La., Olney, Ill. 62450

[21] Appl. No.: 386,992

[22] Filed: Jul. 31, 1989

[51] Int. Cl.$^5$ .................... B29C 73/24; B32B 35/00
[52] U.S. Cl. ........................................ 425/12; 156/94; 248/206.5; 269/8; 425/13
[58] Field of Search ........................... 425/11-13; 264/36; 156/94; 269/8, 276; 248/206.5

[56] References Cited

U.S. PATENT DOCUMENTS

| | | | |
|---|---|---|---|
| 3,518,884 | 7/1970 | Wood, Jr. | 248/206.5 |
| 3,562,366 | 2/1971 | Sohl | 264/23 |
| 3,765,975 | 10/1973 | Hollingsworth | 156/94 |
| 3,988,400 | 10/1976 | Luhman, III | 264/36 |
| 3,993,520 | 11/1976 | Werner et al. | 156/94 |
| 4,032,272 | 6/1977 | Miller | 425/12 |
| 4,047,863 | 9/1977 | McCluskey et al. | 425/13 |
| 4,132,516 | 1/1979 | Story | 425/13 |
| 4,165,397 | 8/1979 | Ogden et al. | 427/140 |
| 4,200,478 | 4/1980 | Jacino et al. | 156/94 |
| 4,291,866 | 9/1981 | Petersen | 269/1 |
| 4,385,015 | 5/1983 | Klettke | 264/36 |
| 4,569,808 | 2/1986 | Smali | 264/36 |
| 4,681,520 | 7/1987 | Birkhauser, III | 425/12 |
| 4,776,780 | 10/1988 | Banks | 425/12 |

Primary Examiner—James C. Housel
Attorney, Agent, or Firm—Haverstock, Garrett and Roberts

[57] ABSTRACT

A support device for use in repairing laminated glass having an exterior portion having a magnetic device and an attachment adapted to hold an arm with an aperture therein adapted to hold a resin injection device in position over a damaged portion of a windshield and an inner portion which includes a magnetic device adapted to be aligned with the magnetic device on the outer portion, the opposite magnetic device holding the arm and resin injection device in position for repair of the damaged portion of the laminated glass.

6 Claims, 2 Drawing Sheets

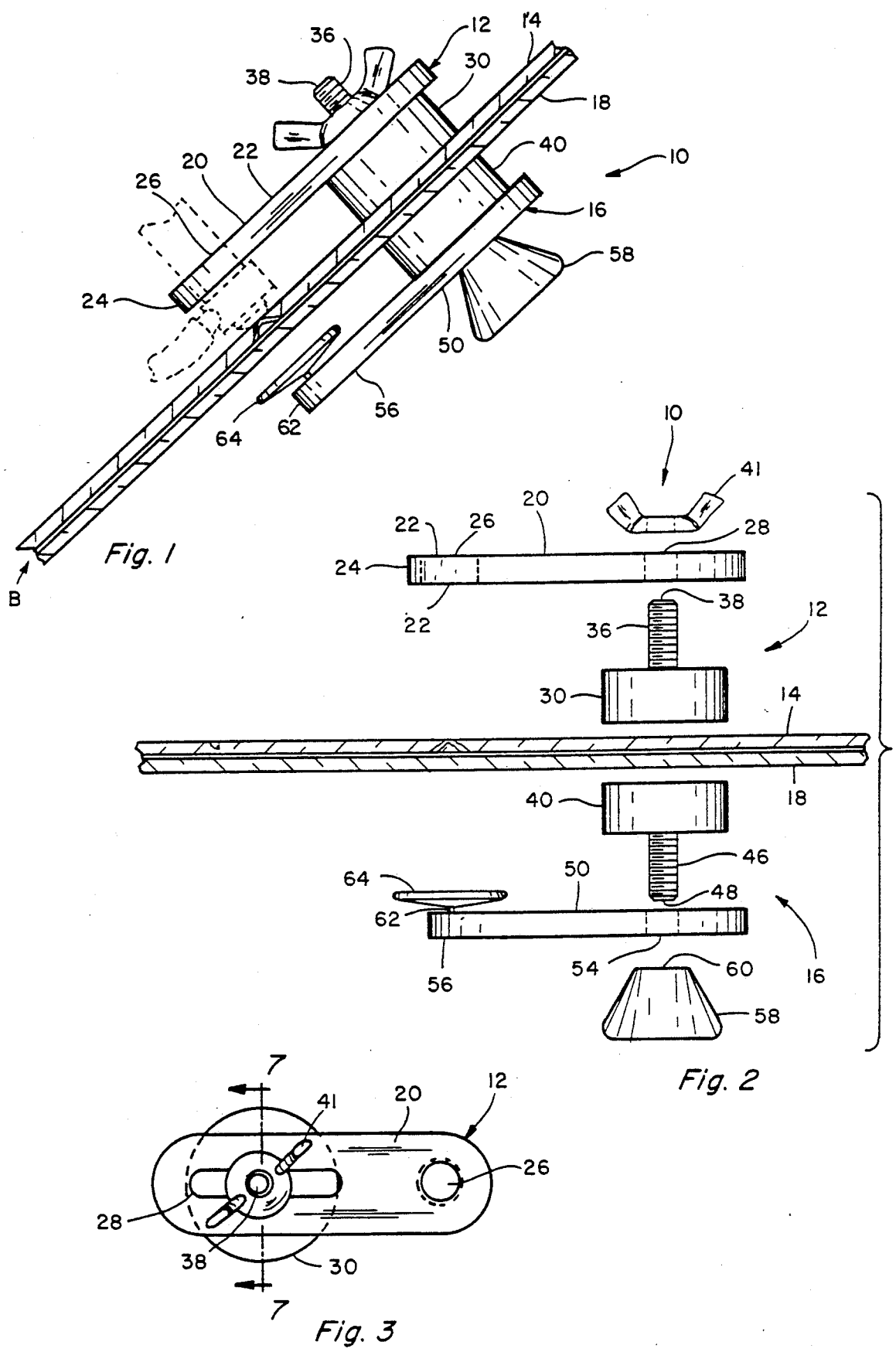

MAGNETICALLY ATTACHED SUPPORT DEVICE FOR WINDSHIELD REPAIR APPARATUS

FIELD OF THE INVENTION

The present invention relates generally to a support device for maintaining windshield repair apparatus in proper position for the repair of chips, cracks or breaks in laminated glass surfaces.

PRIOR ART

The present support device is specifically adapted for attachment to a windshield or other laminated glass surface for the support of an injector assembly such as shown in U.S. Pat. No. 4,291,866. Other support devices are likewise disclosed in U.S. Pat. No. 4,776,780; U.S. Pat. No. 4,681,520 and U.S. Pat. No. 3,988,400. Each of the devices disclosed in these patents attaches to the surfaces of laminated glass by means of a suction cup or alternatively by vacuum pressure. The present device replaces the suction cup and vacuum pressure means of attachment shown in these prior art patents with a more effective, efficient, and easier to use support device.

SUMMARY OF THE INVENTION

The present invention overcomes many of the disadvantages and shortcoming associated with known windshield repair support devices, and teaches the construction and operation of a support device which attaches easily to a windshield or like laminated glass surface while in its installed position and includes an exterior portion having an adjustable extension means adapted to retain a resin injector apparatus in position to repair the damaged glass surface. The extension means also includes a threaded aperture positioned near one side edge thereof and a non-threaded aperture positioned near another side edge thereof opposite that of the threaded aperture. The resin injector apparatus may be removably engaged within the threaded aperture. Likewise, an at least partially threaded rod member having a magnet attached to one end thereof is inserted through the non-threaded aperture and maintained in position by engaging a common wing nut to the threaded free end thereof opposite the magnet. The extension means is likewise disposed to be adjustable by means of loosening or tightening the wing nut.

The present support device further includes an interior portion having a magnet disposed with attachment means. This interior portion of the present magnetic device is used in combination with the exterior portion of the present magnetic device. The interior portion is held in position on the interior surface of an undamaged portion of the laminated glass surface. The magnet of the exterior portion is then placed in position against the exterior surface of the undamaged area of the glass opposite the magnet of the interior portion. In positioning the magnets, the threaded aperture of the extension means is to be positioned directly over the broken, chipped, or cracked area. By placing the two magnets opposite one another on opposite surfaces of the glass, the magnetic field of attraction between the two magnets penetrates through the glass thus locking them both securely in place. Optionally, a mirror system may be attached to the lower magnet and positioned beneath the damaged area in order to aid in positioning the repair apparatus exactly over the damaged area.

These features of the present support device are particularly important to those who repair laminated glass in that there is no worry that the magnets will become unattached during repair and the device is adjustable, allows for full viewing of the repair and is easy to use.

It is, therefore, a principal object of the present invention to provide a support device for a resin injector apparatus used in repairing laminated glass while in its installed position.

Another object is to provide a support device for resin injector apparatus which is fully adjustable.

Another object is to provide a support device for resin injector apparatus which can be securely but removably attached to a laminated glass surface by means of magnets.

Another object is to provide magnetically attachable support device for resin injector apparatus which is equipped with an adjustable mirror system for full viewing of the repair process.

Still other objects, advantages and features with the present invention will become apparent to those skilled in the art after considering the following detailed specification which discloses the present apparatus and several representative embodiments thereof with the accompanying drawings wherein:

BRIEF DESCRIPTION OF THE DRAWINGS

FIG. 1 is a side elevational view of the present support device in an assembled condition;

FIG. 2 is an exploded view showing the support device of FIG. 1;

FIG. 3 is a top elevational view of the outer portion of the present support device in an assembled condition;

DESCRIPTION OF THE PREFERRED EMBODIMENT

Figure 5:
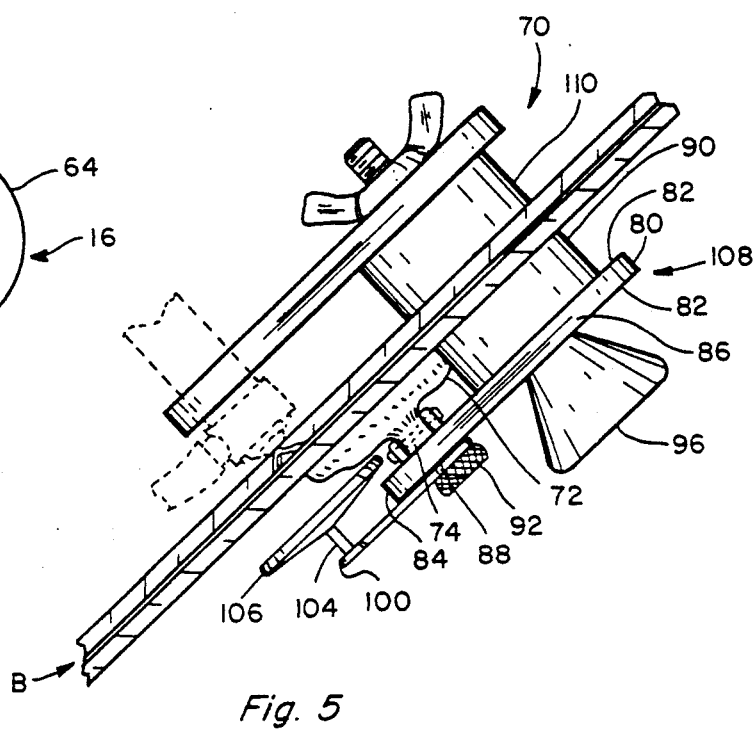
FIG. 5 is a side elevational view of an embodiment of the support device of FIG. 1.

Referring to the drawings more particularly by reference numbers, wherein like numerals refer to like parts, number 10 in FIGS. 1 and 2 identifies a support device constructed according to the teachings of the present invention. The support device 10 is specifically designed to be removably fixed to a sheet of laminated glass B, such as a windshield, as shown in FIGS. 1, 2 and 5. The present support device 10 is to be used to hold a resin injector (not shown) in a secure position in perpendicular contact with the surface of damaged laminated glass B for the repair of the cracks, chips or breaks therein. Support device 10 comprises an outer portion 12 which is positioned on the exterior surface 14 of the laminated glass B (which contains the damaged surface), and an inner portion 16 which is positioned on the interior surface 18 (the non-damaged surface) of the laminated glass B.

Figure 7:
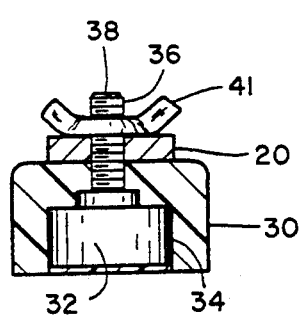
FIG. 7 shows a threaded wing nut and bolt whereby an extension arm is attached to a magnet.

The outer portion 12 of the present support device 10 as further illustrated in FIG. 3, has an extension means 20 having opposed planar surfaces 22 with side edges 24 surrounding the periphery thereof. A threaded aperture 26 is positioned near one side edge 24 of extension means 20 and is disposed for threaded engagement with a resin injector apparatus shown only in outline form. A non-threaded slot 28 is positioned near one side edge 24 of extension means 20 opposite that of the side edge 24 of aperture 26. Non-threaded slot 28 is disposed for the attachment of magnetic means 30 to extension means 20. Magnetic means 30 is preferably a magnet 32 preferably covered with approximately a one-quarter inch thick layer of a plastic material such as acrylic resin 34 as shown in more detail in FIG. 7. Fixed perpendicularly to the magnet means 30 by means of acrylic resin means 34 is a threaded rod member 36 having a free end 38 opposed to magnet means 30. Free end 38 of threaded rod member 36 is inserted through slot 28 so as to extend outwardly therefrom. A threaded winged nut member 41 is then threaded onto free end 38 and threadedly engaged with threaded rod member 36 so as to pull upwardly on and secure tight contact between magnetic means 30 and the planar surface 22 of extension means 20.

Figure 4:
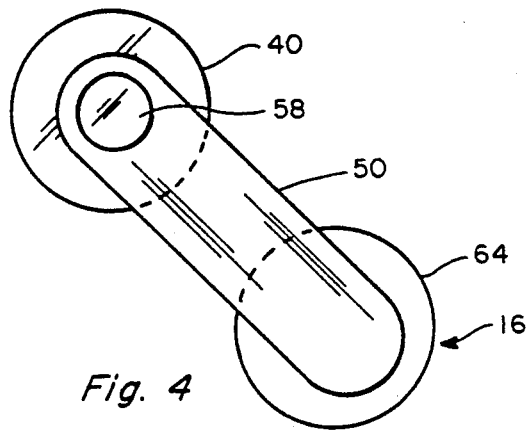
FIG. 4 is a bottom elevational view of the inner portion of the present support device in an assembled condition.

The inner portion 16 of the present support device 10 as further illustrated in FIG. 4, has a magnetic means 40 preferably coated with a plastic material such as an acrylic resin layer of approximately one-quarter of an inch in thickness. Attached to the acrylic resin layer of magnetic means 40 is a threaded rod member 46 having a free end 48. Threaded rod member 46 is disposed for the attachment of a arm member 50. Arm member 50 is planar with one aperture 54 and one free end 56. Fixed to free end 56 of arm member 50 is an attachment means 62 whereby a mirror member 64 may be attached to arm member 50. The free end 48 of threaded rod member 46 is inserted through aperture 54 and is engaged by a handle member 58 having a threaded channel 60 formed therein, although alternatively, an ordinary threaded nut could also be substituted. The handle member 58 is engaged with rod member 46 so as to fix arm member 50 in tight communication between magnet means 40 and handle member 58.

Figure 6:
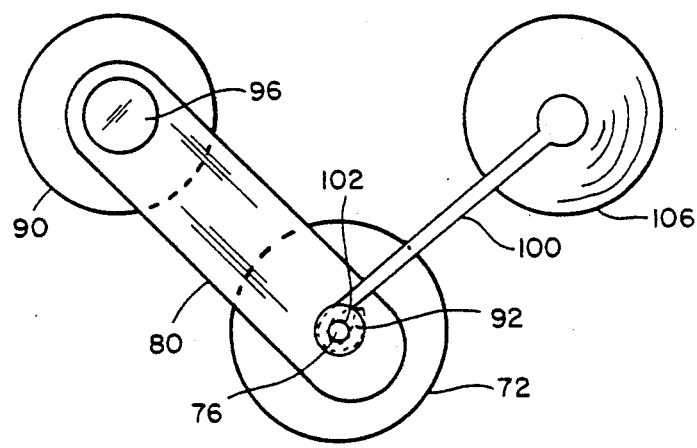
FIG. 6 is a bottom elevational view of the portion of the support device of FIG. 5.

Another embodiment 70 of the present invention is shown in FIGS. 5 and 6 and includes a suction cup 72 formed to have a more rigid block portion 74 on the top thereof for attachment with a threaded rod member 76. A generally rectangular base member 80 having opposed planar surfaces 82 having a plurality of side edges 84 around the periphery thereof is disposed to have two threaded apertures 86 and 88 for attachment of a magnetic means 90 and suction cup 72 respectively. Rod member 6 is inserted through aperture 88 of base member 80. An arm member 100 having an aperture 102 at one end thereof and attachment means 104 supporting a mirror 106 at the other end is likewise attached to base member 80 by means of rod member 6. After rod member 76 is inserted through aperture 88, it is then likewise inserted through aperture 102. A threaded nut member 92 is afterwards engaged with rod member 76 thus securing suction cup 72 and arm member 100 to base member 80. Magnetic means 90 is attached to base member 80 in a like manner by means of aperture 86 and a threaded rod member 94, and a handle member 96 having a threaded channel 98 formed therein.

The preferred method of operating the present support device 10 is to first insert and engage the resin injector device (shown in outline form in FIGS. 1 and 5) in aperture 26 of outer portion 12. The inner portion 16 is then positioned and held against the interior surface 18 of the laminated glass so that mirror member 64 is in alignment directly beneath the damaged area to be repaired. Outer portion 12 with the resin injector properly positioned is then placed on the exterior surface 14 of the laminated glass B so as to have the magnetic means 30 just opposite magnetic means 40. Additionally, outer portion 12 is placed so that the tip of the resin injector is in direct contact with the damaged area. Due to the strong magnetic attraction between magnetic means 30 and 40, both the outer portion 12 and the inner portion 16 lock together with the laminated glass therebetween.

In operating embodiment 70, a suction cup 72 is disposed to hold the inner portion 108 in position against the laminated glass until magnetic means 90 and 110 are in a locked condition on opposite sides of the laminated glass.

Once the present support device is locked into place on the sheet of laminated glass, minor adjustments in positioning can be made without moving the magnetic means by loosening the nut members, adjusting the positioning of portions of the device and then retightening the nut members.

Optional mirror member 64 is an important feature of the present support device 10 in that the repair process is greatly simplified through greater ease in seeing the damaged area and in checking for refractions of light during the repair thereof.

Preferably the generally planar portions of the present support device 10 are constructed from a rigid preferably transparent, plastic material that does not deteriorate quickly and is able to withstand moderate impact and handling without breakage. Any of the known relatively rigid plastic materials may be used. Such rigid plastic materials include phenolic resins, vinyl resins, polyolfin resins, polycarbonates, nylon compositions etc. Other portions of the present invention which would not hinder visibility may be constructed from plastic, metal, metal alloys, fiber-glass or other materials, with the exception of the suction cup and magnets. The suction cup obviously is preferred to be constructed from a more resilient natural or synthetic material such as rubber or plastic. The magnets preferred are rare earth magnets each having a break away force within the range of forty to sixty-five pounds. The magnets are generally cylindrical in shape having an approximate height of one-half of an inch and a diameter of one inch. Additionally, the overall length and diameter of the device can vary greatly. However, for use in glass repair, the present device will be relatively small ranging between approximately two and one half to four inches in length and having the diameter of the outer housing portion at approximately one half inch as is standard in the field.

Thus there has been shown and described a novel support device for maintaining windshield repair apparatus in proper position during the repair of chips, cracks or breaks in laminated glass surfaces while in their vertically installed position which device fulfills all of the objects and advantages sought therefor. Many changes, modifications, variations and other uses and applications of the present construction will however, become apparent to those skilled in the art after considering this specification and the accompanying drawings.

All such changes, modifications, variations and other uses and applications which do not depart from the spirit and scope of the invention are deemed to be covered by the invention which is limited only by the claims which follow.

What is claimed is:

1. A resin injector support device comprising:

a first magnetic portion and a second magnetic portion capable of interlocking through the thickness of a laminated glass sheet
  (1) said first magnetic portion having a magnet and an adjustable extension means connected thereto for engaging a resin injector device, and,
  (2) said second magnetic portion having a magnet and a suction cup connected together, said suction cup being adapted to hold said second magnetic portion in position on a windshield until said first magnetic portion is placed in mating relationship on the opposition side of said windshield, whereby said first magnetic portion and said second magnetic portion are used in conjunction to lock onto a vertically installed laminated glass surface and to support said resin injector device in perpendicular contact therewith during the repair of a damaged windshield.

2. The support device defined in claim 1 wherein said magnets are coated with an acrylic resin layer.

3. The support device defined in claim 1 wherein said magnets each have a break away force within the range of forty-five to sixty-five pounds.

4. The support device defined in claim 1 wherein said magnets are cylindrical in shape having an approximate height of one-half inch and a diameter of one inch.

5. The support device defined in claim 1 wherein said extension means is constructed from a clear plastic material.

6. The support device defined in claim 1 wherein said second magnetic portion has an arm member for the support and attachment of a mirror.

* * * * *

UNITED STATES PATENT AND TRADEMARK OFFICE
CERTIFICATE OF CORRECTION

PATENT NO. : 5,028,223

DATED : July 2, 1991

INVENTOR(S) : Stephen L. Ameter

It is certified that error appears in the above-identified patent and that said Letters Patent is hereby corrected as shown below:

Column 3, line 48, "6" should be --76--.

line 52, "6" should be --76--.

Signed and Sealed this

Seventeenth Day of November, 1992

Attest:

DOUGLAS B. COMER

*Attesting Officer*   *Acting Commissioner of Patents and Trademarks*